United States Patent [19]
Goossen et al.

[11] Patent Number: 5,500,761
[45] Date of Patent: Mar. 19, 1996

[54] MICROMECHANICAL MODULATOR

[75] Inventors: Keith W. Goossen, Aberdeen; James A. Walker, Howell, both of N.J.

[73] Assignee: AT&T Corp., Murray Hill, N.J.

[21] Appl. No.: 187,676

[22] Filed: Jan. 27, 1994

[51] Int. Cl.⁶ .................................... G02B 26/00
[52] U.S. Cl. .................. 359/290; 359/248; 359/291; 257/415; 257/419; 257/420
[58] Field of Search ................... 359/248, 290, 359/291; 257/415, 419, 420

[56] References Cited

U.S. PATENT DOCUMENTS

| | | | |
|---|---|---|---|
| 4,849,071 | 7/1989 | Evans et al. | 156/644 |
| 4,916,497 | 4/1990 | Gaul et al. | 357/19 |

FOREIGN PATENT DOCUMENTS 3269410  12/1991  Japan.

OTHER PUBLICATIONS

Aratani, et al., "Process and Design Considerations for Surface Micromachined Beams for a Tunable Interferometer Array in Silicon," Proceedings of the IEEE Micro. Electro-Mech. Workshop, Ft. Lauderdale, Fla., Feb. 7–10, 1993, pp. 230–235.

Condon and Odishaw, *Handbook of Physics*, McGraw Hill, 2nd ed., 1967, pp. 6–102, 6–103.

Solgaard, et al., "Deformable Grating Optical Modulator," Optical Letters, vol. 17, No. 9, May 1992, pp. 688–690.

Wiszniewski, et al., "Mechanical Light Modulator Fabricated on a Silicon Chip Using SIMOX Technology," International Conference on Solid State Sensors & Actuators, Yokohama, Japan, Jun. 7–10, 1993, pp. 1027–1030.

*Primary Examiner*—Georgia Y. Epps
*Assistant Examiner*—Dawn-Marie Bey

[57] ABSTRACT

A method and apparatus for modulating an optical signal using a micromechanical modulator are disclosed. The modulator comprises a membrane, which consists of at least one layer, and a substrate, spaced to form an air gap. The layers of the membrane are characterized in that there is a relationship between the refractive indices of the layers and the refractive index of the substrate. The membrane is suspended in a first position over the substrate by a flexible support arrangement. Bias is applied to the membrane and the substrate to create an electrostatic force to move the membrane towards the substrate to a second position. The reflectivity of the device to an optical signal changes as the membrane moves from the first position to the second position, thereby modulating the signal.

55 Claims, 12 Drawing Sheets

MICROMECHANICAL MODULATOR

FIELD OF THE INVENTION

This invention relates generally to optical modulators, and more particularly to surface normal mechanical optical modulators.

BACKGROUND OF THE INVENTION

It is desirable in optical wavelength-division-multiplexing networks to have inexpensive light modulators that have high contrast and wide optical bandwidths. In certain cases, such as audio and video transmission, these modulators need only operate at frequencies up to several megahertz.

A modulation device particularly well suited for the above application is a surface normal micromechanical modulator. This device may be described as having a variable air gap defined by two layers of material. Typically, surface normal light modulators operate by changing the amount of light reflected in the surface normal direction, i.e., the direction normal to the substrate surface. This may be achieved by varying the variable air gap, which alters the optical properties of the device.

Compared with other modulation means, such as a laser, micromechanical modulators are limited in terms of modulation frequency. However, the micromechanical modulators are less expensive to implement and are readily fabricated on silicon substrates facilitating integration with silicon based electronics. Further, unlike the typical semiconductor laser, micromechanical modulators operate in a surface normal manner. This is an attractive feature since a device which operates in this manner requires less wafer space than a device, such as a typical semiconductor laser, in which the operating cavity is formed in the plane of the wafer. Many thousands of surface normal modulators may be formed on a single wafer, minimizing cost. Thus, where the operating frequency is limited, the micromechanical modulator may be the modulation device of choice.

One such micromechanical modulator has been described by Aratani et al. in "Process and Design Considerations for Surface Micromachined Beams for a Tuneable Interferometer Array in Silicon," Proc. IEEE Microelectromech Workshop, Ft. Laud., Fla., Feb. 7–10, 1993 at 230–35. This article, and all other articles referenced in this specification are herein incorporated by reference in their entirety. Aratani's modulator is described as having a diaphragm mirror consisting of a polysilicon/silicon nitride multilayer supported by thin beams over a substrate, also partially mirrored by a polysilicon/silicon oxide multilayer. As a voltage is applied between the membrane and the substrate, the membrane is pulled toward the substrate. The device is said to behave as a Fabry-Perot interferometer wherein, given two mirrors having equal reflectivity, the reflectivity of the device approaches zero at the resonant wavelength of the cavity. As the membrane moves, altering the cavity, the reflectivity of the device rises. The change in reflectivity modulates the optical signal. While a large change in reflectivity is said to be achieved, the optical bandwidth of the optical resonator based modulator is limited. The contrast ratio of such a device falls off sharply as the wavelength of the incident light varies from the resonant wavelength of the device.

A second micromechanical modulator was described by Solgaard et al in "Deformable Grating Optical Modulator," Optics Lett 17(9) 688–90 (1992). This modulator was described as having a reflection phase grating of silicon nitride beams which is coated with metal and suspended over a substrate which is also coated with metal. An air gap separates the grating and substrate. In the absence of a biasing voltage, the path length difference between the light reflected from the grating beams and that reflected from the substrate is equal to the wavelength of the incoming light. These reflections are therefore in phase, and the device reflects the light in the manner of a flat mirror. When a voltage is applied between the beams and the substrate, the beams are brought in contact with the substrate. The total path length difference between the light reflected from the grating beams and that reflected from the substrate changes to one half of the wavelength of the incident light. In this case, the reflections interfere destructively, causing the light to be diffracted.

The deformable grating optical modulator does not achieve a low reflectivity state. Rather, it switches to a diffracting state. In the diffracting state, incident light is scattered into higher-order diffraction modes of the grating, so that the amount of light reflected into the zero order (surface-normal) mode is minimized. Such diffraction may be an undesirable aspect of the deformable grating optical modulator. If the numerical aperture of the incoming fiber or detection system is large enough to pick up the higher order diffraction modes, a degradation in contrast will result. Further, if this device is implemented in a system using arrays of optical beams or fibers, a significant crosstalk may be introduced.

Accordingly, there is a need for a micromechanical modulator which provides high contrast modulation for optical signals over a range of wavelengths, in particular from 1300 to 1550 nanometers (nm).

SUMMARY OF THE INVENTION

A method and apparatus for modulating fan optical signal are disclosed. The apparatus, which may be formed on a semiconductor wafer or chip, comprises a membrane and a substrate, spaced to form an air gap. The membrane consists of one or more layers, and is suspended over the substrate by support arms. Bias is applied to the membrane and the substrate to create an electrostatic force to move the membrane towards the substrate. The layers of the membrane are characterized in that there is a relationship between the refractive indices of the layers and the refractive index of the substrate. Each layer of the membrane has a thickness which is approximately equivalent to one-quarter of the wavelength of an optical signal to be modulated. In a further embodiment, the modulator incorporates an optical fiber to facilitate integration of the modulator into a fiber network.

In a first arrangement of a modulator according to the present invention, the air gap, in the unbiased state, is one-quarter of a wavelength of the optical signal. In this state, the membrane and air gap function as a high reflectivity mirror. As bias is applied, the membrane moves toward the substrate. When the air gap is zero, the membrane functions as an anti-reflection coating for the substrate. The change in reflectivity of the membrane facilitates modulation of the optical signal.

In a second arrangement according to the invention, the air gap, in the unbiased state, is a multiple of one-quarter of a wavelength of the optical signal. Where the air gap is an odd multiple of one-quarter wavelength, the membrane and air gap function as a high reflectivity coating. Where the air gap is an even multiple of one-quarter wavelength, the membrane and air gap function as an anti-reflection coating.

Under the action of bias, the membrane moves through one-quarter of a wavelength to an anti-reflection state or a maximum reflection state depending upon the state of the unbiased membrane. In the second arrangement, the membrane does not contact the substrate.

BRIEF DESCRIPTION OF THE DRAWINGS

Further features of the invention will become more apparent from the following detailed description of specific embodiments thereof when read in conjunction with the accompanying drawings, in which like elements have like reference numerals and in which.

DETAILED DESCRIPTION OF THE INVENTION

Figure 1:
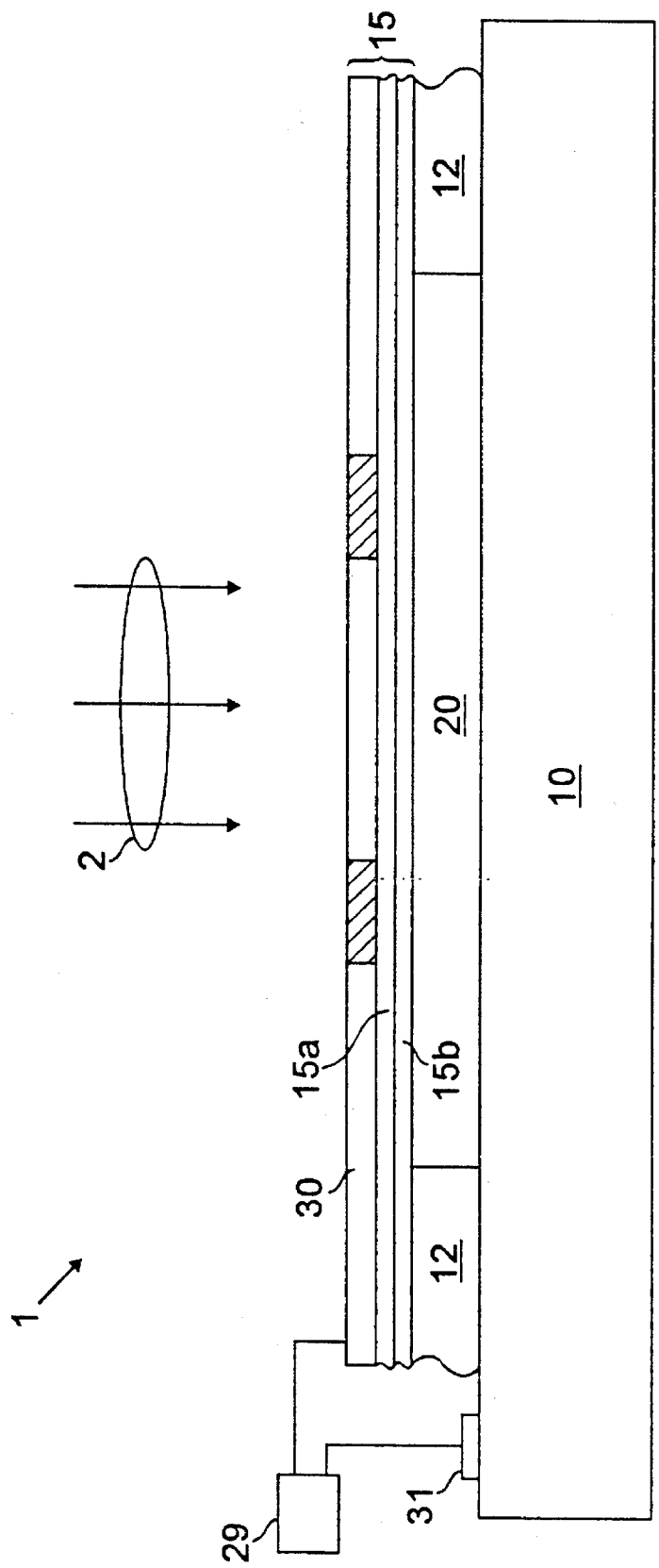
FIG. 1 is a side view of an embodiment of a micromechanical modulator according to the present invention where the modulator is shown in its unbiased position.
Figure 2:
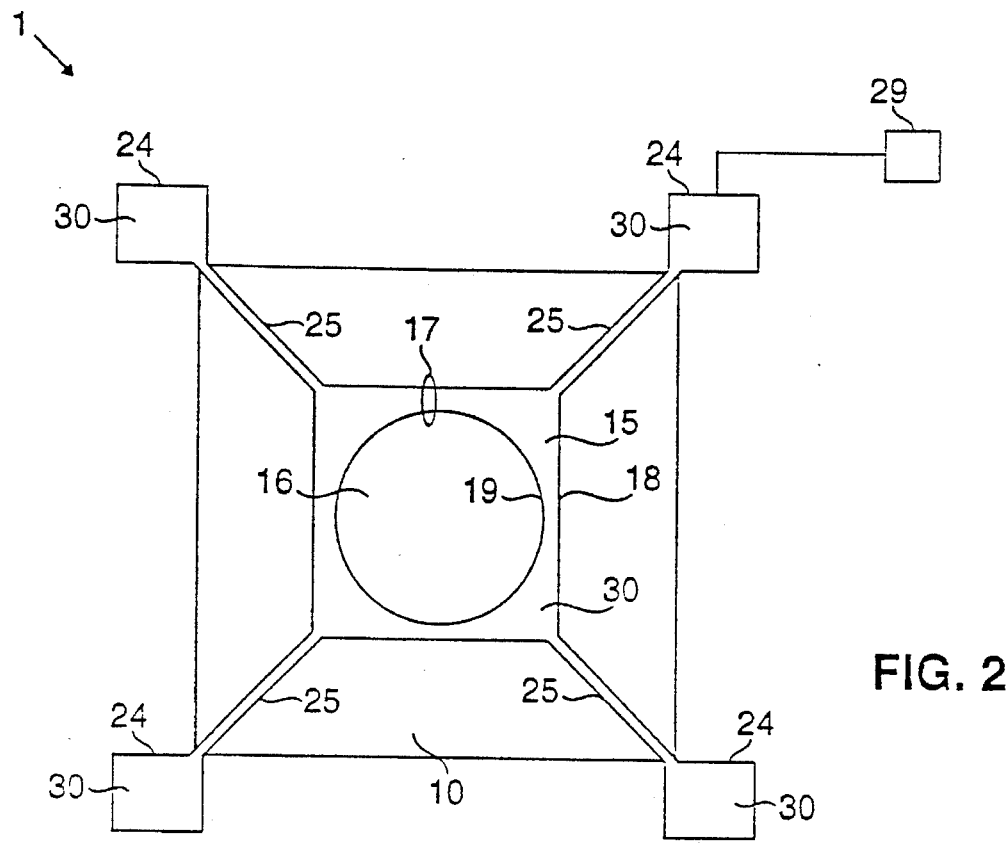
FIG. 2 is a plan view of the micromechanical modulator of FIG. 1.

FIGS. 1 and 2 show an embodiment of a micromechanical modulator 1 according to the present invention. As shown in FIG. 1, which is a cross-sectional view through line aa in FIG. 2, the device comprises a substrate 10 and a membrane 15 having one or more layers, such as layers 15$a$, 15$b$. The membrane 15 and substrate 10 are spaced from each other, and define an air gap 20 between them. As shown in FIG. 2, which is a plan view of the apparatus of FIG. 1, the membrane 15 is suspended over the air gap 20 by support arms 25. The membrane 15 may also comprise an electrode 30, and the substrate 10 may also comprise an electrode 31. The electrodes 30 and 31 are provided so that a voltage may be applied across the membrane 15 and the substrate 10 to create an electrostatic force to move the membrane towards the substrate. The device 1 may be suitably formed on a semiconductor chip or wafer.

The substrate 10 may be formed of a conductive material, which is either transparent or absorbing over the operating optical bandwidth. Suitable materials include, but are not limited to, silicon, gallium arsenide, indium phosphide, germanium or indium tin oxide (ITO) coated glass. If a semiconductor material is used for the substrate, it should be appropriately doped. Preferably, the substrate is silicon, which should be doped with any Group III or Group V element, typically phosphorus or boron.

The membrane 15 comprises a single optically active layer 15$a$ of material which is characterized by a refractive index which is approximately equal to the square root of the refractive index of the substrate 10. The layer 15$a$ functions as a reflection/anti-reflection layer as will be described below. Suitable materials for the layer 15$a$ include, but are not limited to silicon oxide, or, more preferably, silicon nitride. The membrane 15 may also include a second, optional layer 15$b$ of material which is characterized by a refractive index which is approximately equal to the refractive index of the substrate 10. The layer 15$b$ will typically be formed of the same material as the substrate 10, preferably silicon. If silicon is used for the optional layer 15$b$, it may have a polycrystalline structure, such as polysilicon, or it may have an amorphous or single crystal structure. The layer 15$b$ functions as a strained layer for producing tension in the membrane 15. Where the membrane 15 comprises two layers, the optional layer 15$b$ is nearest to the substrate 10.

The thickness of each of the layers 15$a$, 15$b$ of the membrane 15 is preferably one-quarter of a wavelength (as measured in the material comprising the layer) of an incident optical beam 2. Where the incident optical beam 2 has a single wavelength, the membrane thickness is readily determined. However, the incident optical beam 2 may be comprised of a number of spectral components of differing wavelengths. For example, the incident optical beam 2 may have a bandwidth extending from 1300 nm to 1550 nm. In such a case, the wavelength selected as the basis (the basis wavelength) for the membrane thickness is determined by selecting the wavelength at the mid-point of the desired bandwidth. Some loss in modulator performance, i.e, contrast, is expected as the wavelength of the spectral components deviates from the basis wavelength. However, depending upon modulator configuration, the loss in contrast can be reduced to a negligible amount, as is discussed below in conjunction with FIGS. 17 and 18.

The height of the air gap 20, i.e, the distance between the membrane 15 and substrate 10, should be a multiple of one-quarter of the basis wavelength in the unbiased position. In other words, the air gap 20 should be mλ/4, where m is an integer.

The flexible support arms 25, which suspend the membrane 15 above the substrate 10, may be arranged in any convenient manner and may number more or less than four. The flexible support arms 25 serve as a support means for the membrane 15 and also allow the membrane to move relative to the substrate. While a single structure, i.e., the support arms, provides this dual function, these functions could be provided by independent structures. For example, a rigid support used in conjunction with a separate flexing member can provide support and mobility for the membrane 15. Other configurations and arrangements capable of supporting the membrane 15, and allowing it to move, are within the contemplated scope of the present invention; it being recognized that such variations will occur to those skilled in the art in view of the present teachings. In addition, the support arms 25 may be part of the membrane 15, or, alternatively, may be a separate structure formed of a different material.

Electrodes 30 may comprise a layer of conductive material deposited on the layer 15a. Any suitably conductive material may be used to form the electrodes, including, but not limited to, aluminum, platinum, tungsten, conducting silicon, or, preferably, gold. The electrodes 30 form a continuous conductive layer covering at least a portion of the support arms 25 and the perimeter of the optically active layer 15a forming a border region 17. The electrodes may further include a region 24 extending beyond each support arm 25. Alternatively, the optional layer 15b of the membrane may be formed from a conductive material so that a separate electrode 30 is not required. An electrode 31 is formed on the substrate 10, as well. The separate electrode 31 is not required if the substrate 10 is suitably conductive. The electrodes, or conducting material if discrete electrodes are not provided, are in electrical contact with a controlled voltage source 29.

The inner edge 19 of the border region 17 defines an optical window 16 in the membrane 15. While the optical window 16 is shown to have a circular shape in FIG. 2, the window 16 may have any shape. The size of the optical window will vary with the particular application for which the invention is used. The optical window 16 must be sized so that the optical "spot" produced by the optical window will be captured by the numerical aperture of the waveguide or other optical device being used in conjunction with the invention. By minimizing the size of the optical window, the overall membrane size, and hence its mass, may be minimized. This reduction in mass results in a better response time for the modulator.

Figure 3:
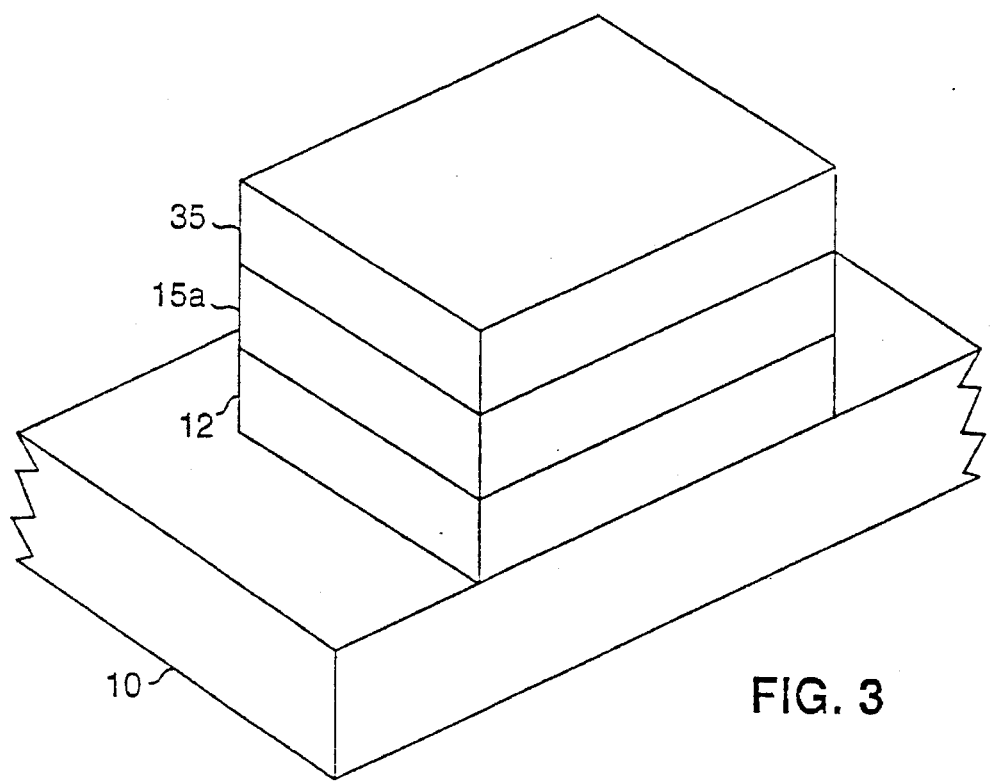
FIG. 3 is a perspective view of various layers of material deposited on a substrate, which layers will be patterned into a micromechanical modulator according to the present invention.

The micromechanical modulator 1 of FIGS. 1 and 2 may be formed as follows. The substrate 10, which may be in the form of a wafer, is preferably silicon which is doped with phosphorus or boron. As shown in FIG. 3, several layers of material, as described below, are deposited on the substrate 10. First, a sacrificial layer 12 of an erodible material is deposited on the substrate. The erodible material is chosen so that a suitable wet etch will erode this material at a much greater rate than any other of the materials which comprise the device. Suitable erodible materials include, but are not limited to, silicon dioxide and aluminum. The erodible material is deposited to a thickness approximately equivalent to that desired for the unbiased air gap 20.

If a two layer membrane is desired, a layer of polysilicon or other suitable material is deposited to form layer 15b, not shown in FIG. 3. Next, a suitable material, preferably silicon nitride, is deposited to form the optically active layer 15a. Layers 15a and 15b should be deposited to a thickness equal to about one-quarter of a wavelength (as measured in the materials comprising the layers) of the basis wavelength of the incident optical beam 2. The silicon nitride is deposited under conditions so as to achieve a refractive index approximately equal to the square root of the refractive index of the silicon substrate. Techniques for tailoring the refractive index of a material are well known to those skilled in the art. See Smith et al., "Mechanism of SiNxHy Deposition from $N_2$—$SiH_4$ Plasma," Jnl. Vac. Sci. Tech. B(8), #3 at 551–57 (1990).

Figure 4:
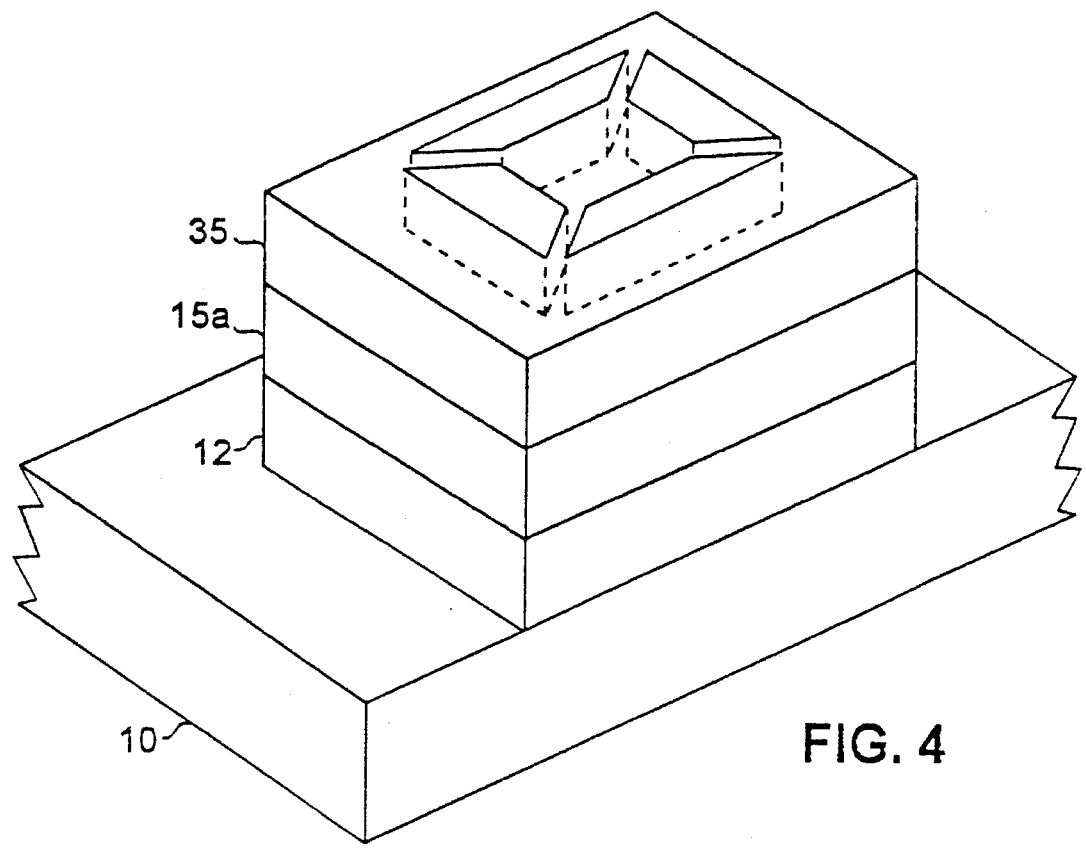
FIG. 4 shows the layers of FIG. 3 with holes patterned in the photoresist layer.

Two photolithographic steps follow the deposition of these layers. The photolithographic process is well known to those skilled in the art and the details of this process will not be discussed in detail here. See Ruska, *Microelectronic Processing*, Chap. 4, "Photolithography," at 114–17 (1987) In the first photolithographic step, which may be referred to as the etch step, a photoresist 35 is applied to layer 15a. Four openings are then created in the photoresist layer, as shown in FIG. 4, using an appropriately patterned mask. The openings are shown as trapezoidal in shape. The shapes of the openings are a function of the desired support arm arrangement. In the micromechanical modulator 1 shown in FIG. 2, the support arms 25 originate at the corners of a first square and terminate at the corners of a second smaller square (the membrane 15) located within the perimeter of first square. Thus, trapezoidal shaped openings define the structure. As previously discussed, the support arms 25 may be arranged in any convenient manner, may number more or less than four and may have any suitable physical configuration. For other support arm arrangements, the openings created in the photoresist layer may therefore differ in number and shape from those shown in the present example. Small openings, not shown, may be provided near the center of the membrane 15 to facilitate removal of a portion of the sacrificial layer 12 to create the air gap 20.

Figure 5:
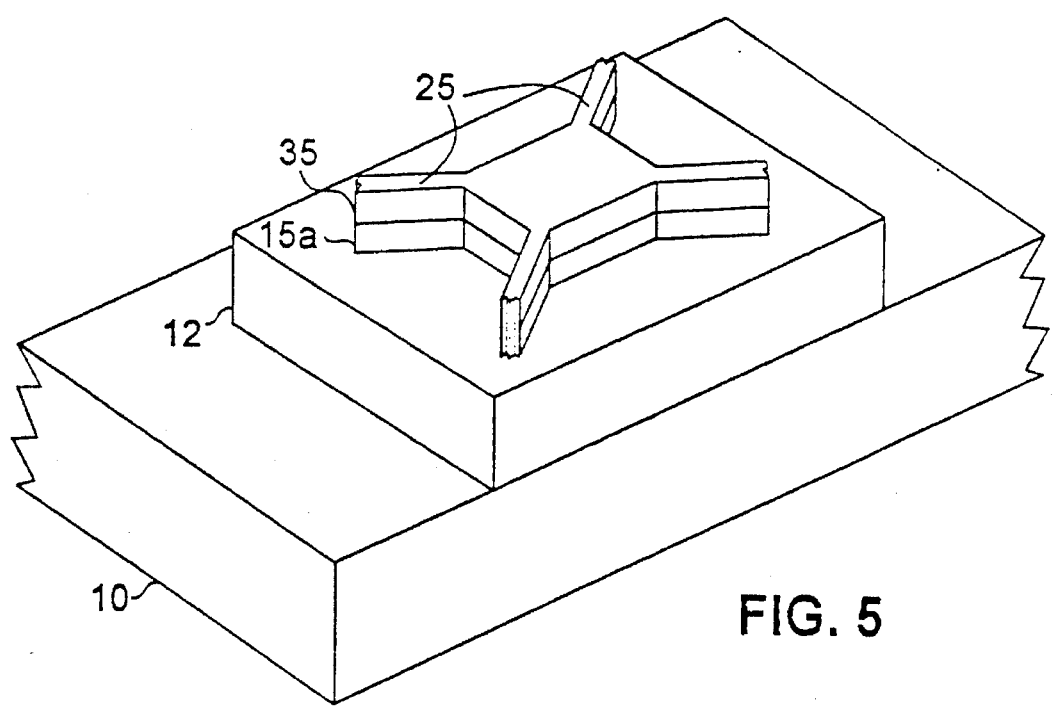
FIG. 5 is a cutaway view of the layers of FIG. 3 after patterning and etching to define the membrane and support arms.

The silicon nitride located beneath the trapezoidal openings is removed using reactive ion etching or other suitable methods. As shown in FIG. 5, as four trapezoidal shaped openings are created in the silicon nitride layer, the support arms 25 and the membrane 15 are defined. FIG. 5 is a cutaway view, wherein the silicon nitride and photoresist surrounding the structure are not shown. It should be understood that the membrane 15 and support arms 25 are surrounded by material comprising layers 15a and 35, other than the trapezoidal shaped regions which have been removed as described.

The optically active layer 15a is required only within the optical window 16. The layer 15a may, therefore, be preferably patterned into a circle or other shape consistent with the shape of the optical window 16. This would require an additional photolithographic step.

Figure 6:
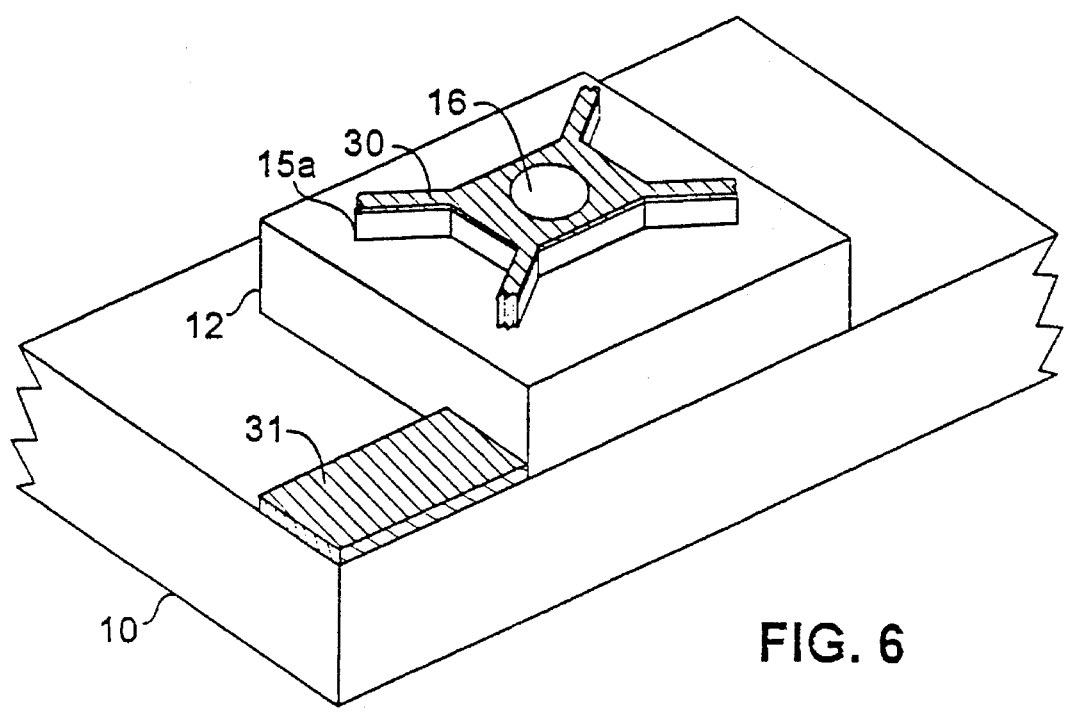
FIG. 6 shows contacts added to the arrangement shown in FIG. 5.

Hardened photoresist remaining on the structure is then removed in preparation for a second photolithographic step. In the second photolithographic step, the electrodes 30 are deposited. Photoresist is applied and patterned using a second photomask. The areas of the device which are not to be coated with conductive material are protected by the hardened photoresist. Conductive material, such as gold or aluminum, is deposited at discrete regions, as shown in FIG. 6, on the layer 15a. Specifically, conductive material may be deposited at a region 24 extending beyond each of the support arms, on the support arms 25 and along the edge of the layer 15a to form the border region 17, as shown in FIG. 2. The conductive material so deposited forms a continuous surface for electrical conduction, defining electrode 30. An electrode 31 is also formed on the substrate 10 by depositing conductive material thereon.

Figure 7:
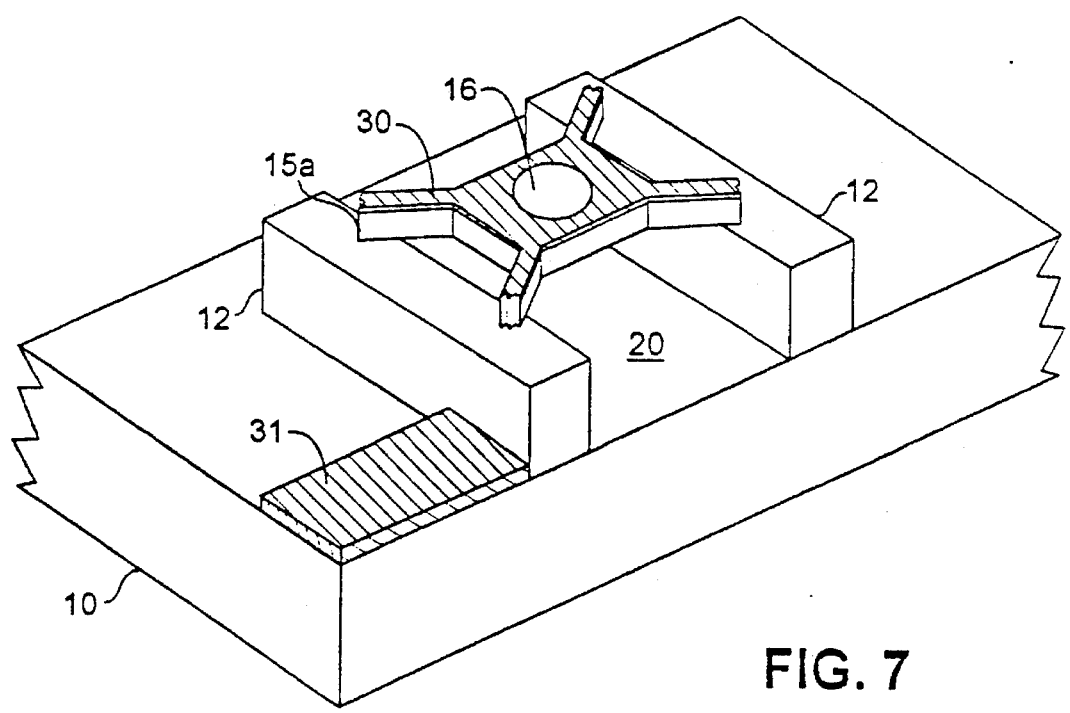
FIG. 7 shows the erodible layer etched away to form an air gap between the membrane and the substrate.

The structure is then placed in a suitable etch bath for etching the sacrificial layer 12 without attacking the silicon nitride. Suitable etches include, but are not limited to, commercial aluminum etchant if the sacrificial layer is aluminum, and HF acid based solutions. As shown in FIG. 7, the air gap 20 is formed as the portion of the sacrificial layer 12 of silicon dioxide or aluminum beneath the membrane 15 and support arms 25 are removed. The etch is timed to limit the amount of the sacrificial layer 12 which is removed, defining the extent of the air gap 20.

Figure 8:
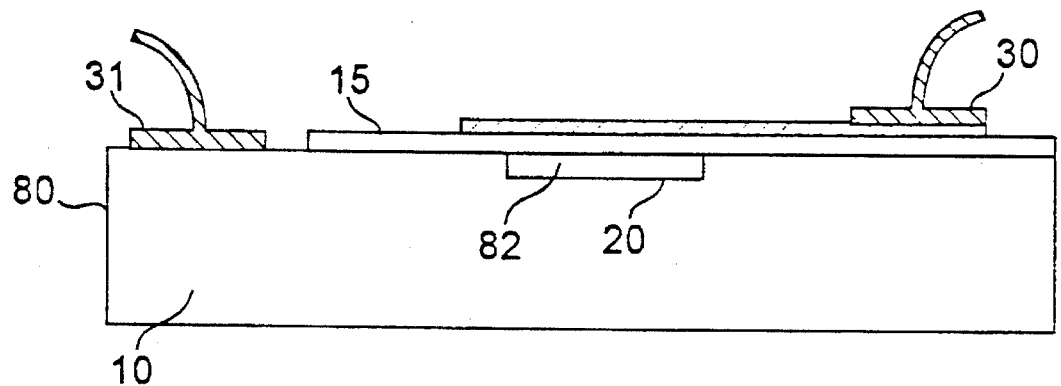
FIG. 8 shows a preferred embodiment of a micromechanical modulator according to the present invention.
Figure 9:
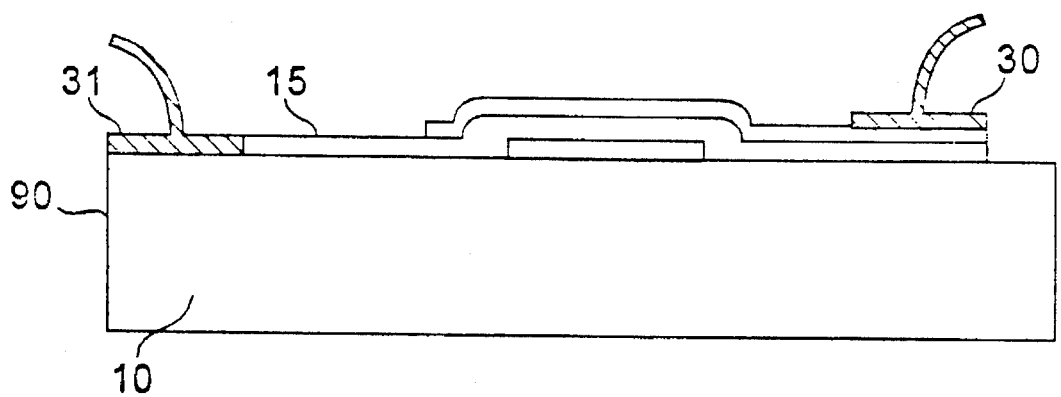
FIG. 9 shows a second preferred embodiment of a micromechanical modulator according to the present invention.

FIGS. 8 and 9 show two preferred embodiments of a micromechanical modulator according to the present invention. FIG. 8 shows a micromechanical modulator 80 wherein a well 82 is formed in the substrate 10. The membrane 15 is formed adjacent to the substrate 10. As in the previous embodiment, the membrane may be comprised of one or more layers. An air gap 20 is defined in the region where the membrane 15 overlays the well 82. As in the previous embodiment, electrodes 30 and 31 are provided on the membrane 15 and the substrate 10 so that a voltage can be applied to the device 80 creating an electrostatic force between the membrane and the substrate. The membrane 15 and support arms 25 of the device 80 may have a configuration like the previous embodiment, or may be configured in other suitable arrangements which may occur to those skilled in the art in view of the teachings provided herein.

To form the micromechanical modulator 80, the well 82 is formed in a substrate 10 using milling or etching techniques known to those skilled in the art. The depth of the well should be equal to the desired thickness of the air gap 20 in the unbiased position. The well 82 is then filled with an erodible material, such as silicon dioxide or aluminum as previously discussed. Next, the membrane layer 15a or layers 15a and 15b are deposited as described in the previous embodiment. Photoresist is applied and patterned to form the membrane 15 and support arms 25 as previously discussed. The erodible material is etched away, resulting in the air gap 20. The well 82 defines the boundaries of the air gap, i.e, the extent of the etch, so the attention to the timing of the etch is not as critical as for the previous embodiment.

In a preferred embodiment for forming the micromechanical modulator 80, a silicon nitride layer is formed on a silicon wafer. An opening is formed in the silicon nitride layer down to the silicon wafer, at the intended site for the well 82. The opening may be formed using reactive ion etching or other methods known to those skilled in the art. The wafer, with the etched silicon nitride layer, is then placed in a thermal oxidation furnace. Silicon which is exposed to the atmosphere in the furnace, i.e., the silicon exposed as a result of the opening which is formed as described above, is oxidized. The oxide grows into the silicon wafer. This is the functional equivalent of filling the well 82 with silicon dioxide, as described above. Thermal oxidation is well characterized and understood by those skilled in the art. Through the appropriate combination of exposure time, furnace temperature and environment, the oxide penetration of the silicon wafer can be controlled to the desired depth, i.e, that depth which results in a suitable air gap 20 upon removal of the silicon oxide. The silicon nitride layer is then removed, and silicon nitride is reapplied to the wafer, forming the layer 15a. The silicon nitride layer 15a is then patterned and etched, contacts are deposited, and the silicon oxide is removed to form the well 82 which results in an air gap 20 between the silicon nitride layer 15a and the substrate 10, i.e., the silicon wafer.

Figure 10:
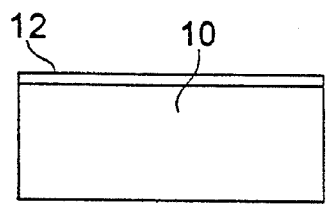
FIGS. 10–13$b$ show successively the formation of the modulator of FIG. 9, where FIGS. 10, 11, 12$a$ and 13$a$ are sideviews, and FIGS. 12$b$ and 13$b$ are plan views.
Figure 11:
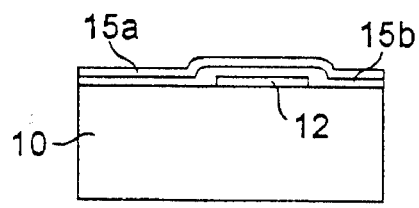
Figure 12A:
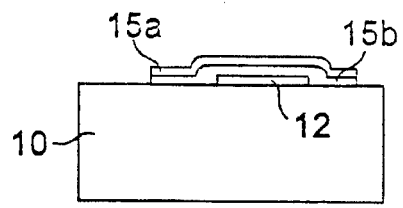
Figure 12B:
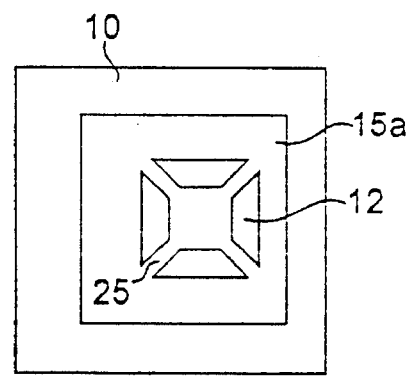
Figure 13A:
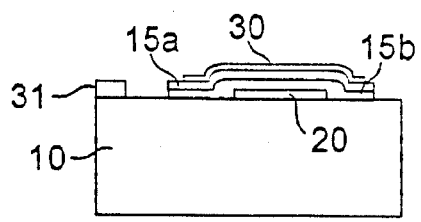
Figure 13B:
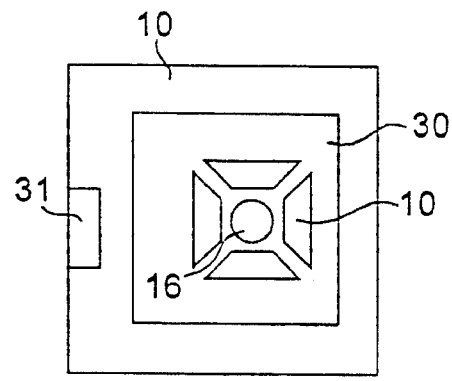

FIG. 9 shows a second preferred embodiment of a micromechanical modulator 90 according to the present invention. Rather than forming a well in the substrate to create the air gap 20, as in the previous embodiment, an "island" 13 of erodible material is formed on the substrate 10 which will be etched away to form the air gap 20. The formation of a micromechanical modulator 90 is illustrated in FIGS. 10–13b. As shown in FIG. 10, an appropriately prepared substrate 10 is coated with a sacrificial layer 12 of erodible material. The sacrificial layer 12 is patterned into an "island" 13 having the dimensions desired for the air gap 20, shown in FIG. 11. The layer 15a or layers 15a and 15b are next deposited on the island 13 of erodible material. These layers extend beyond the island 13 onto the substrate 10. Photoresist is applied and the layers 15a, 15b are patterned into the membrane shape, as shown in cross section in FIG. 12a and in a plan view in FIG. 12b. Next, the contacts 30 and 31 are deposited and patterned. Finally, the erodible material is removed from beneath the layers 15a, 15b, forming an air gap 20 between the layers and the substrate 10. The etch to remove the erodible material proceeds until the material forming the layer 15b, if present, or layer 15a, is encountered. As in the previous embodiment, this simplifies the formation of the air gap relative to a timed etch. FIGS. 13a and 13b show the fully formed micromechanical modulator 90.

In operation, the devices 1, 80 and 90 function as follows. If the air gap 20, in the unbiased position, is an odd multiple of one-quarter of the basis wavelength, the membrane 15 and air gap 20 function as a high reflection mirror. If the air gap 20 is an even multiple of one-quarter of the basis wavelength, the membrane and air gap serve as a anti-reflection coating for the substrate 10. As an electrical signal, such as a varying voltage, is applied to the electrodes 30 and 31, an electrostatic force is created between the membrane 15 and the substrate 10. This force causes the membrane to move toward the substrate. As the membrane 15 moves from its unbiased position, the reflectivity of the device changes. As the membrane 15 moves one-quarter of the basis wavelength, a minimum or maximum reflectivity state will be encountered, depending upon the state of the membrane 15 in the unbiased position.

This behavior is a function of the relationship of the refractive index of the membrane layer 15a and the refractive index of the substrate 10. Where the refractive index of the membrane is about equal to the square root of the refractive index of the substrate, an anti-reflection condition can be created. This relationship is well known to those skilled in the art. See Condon and Odishaw, ed., "Handbook of Physics, " at 6-102–6-103, (2nd ed., McGraw-Hill, 1967). For a membrane 15 having a layer or layers $\lambda/4$ in thickness and an air gap 20 of $m\lambda/4$, the membrane 15 and air gap 20 function as a high reflection mirror where m is an odd integer and as an anti-reflection coating where m is 0 or an even integer. Modulation of an optical signal is thus achieved by altering the reflectivity of the device.

Figure 14:
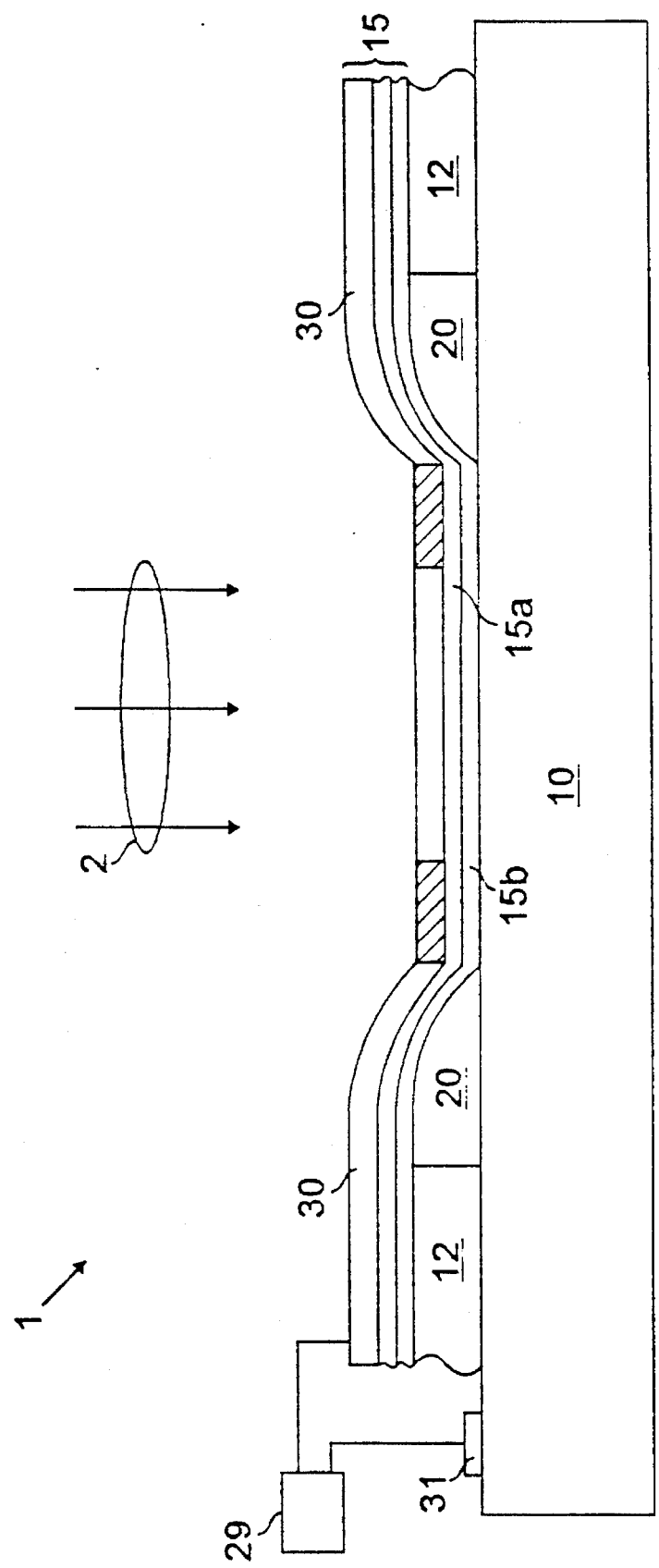
FIG. 14 is a side view of a modulator under bias, where the modulator is formed according to a first arrangement wherein, under the action of bias, the membrane contacts the substrate.

In a first arrangement, a micromechanical modulator according to the present invention, such as modulators 1, 80 or 90 is formed so that the air gap 20, in the unbiased position, is one-quarter of the basis wavelength. This represents a maximum reflection state. To change the reflectivity of the modulator, bias is applied to the electrodes 30 and 31, causing the membrane to move toward and contact the substrate 10, as shown in FIG. 14, creating an anti-reflection state.

In a second arrangement, a micromechanical modulator according to the present invention is formed so that the air gap 20, in the unbiased position, is a multiple of one-quarter of the basis wavelength. There are two configurations of the second arrangement of the micromechanical modulator. In the first configuration, the air gap 20 is an odd multiple of one-quarter of the basis wavelength in the unbiased position, placing the modulator in a high reflection state. Under the action of bias, the membrane 15 moves through one-quarter of a wavelength to an even multiple of one-quarter of the basis wavelength, placing the modulator in an anti-reflection state. In the second configuration, the air gap 20 is an even multiple of one-quarter of the basis wavelength in the unbiased position, placing the modulator in an anti-reflection state. Under the action of bias, the membrane 15 will move through one-quarter of a wavelength to an odd multiple of one-quarter of the basis wavelength, placing the modulator in a high reflection state. While it is preferred that the membrane 15 move one-quarter of a wavelength under bias, it should be understood that the membrane could move a greater distance. The modulator will cycle-through a maximum and minimum reflectivity state each time the membrane moves a distance of one-quarter of a wavelength.

In either configuration of the second arrangement, the membrane 15 does not contact the substrate 10 in contrast to the first arrangement. By avoiding contact with the substrate 10, the second embodiment of a micromechanical modulator according to the present invention is expected to be more reliable than the first embodiment. However, as will be discussed below in conjunction with FIGS. 17 and 18, it is expected that the first embodiment will maintain better contrast over a larger bandwidth than the second embodiment.

Figure 15:
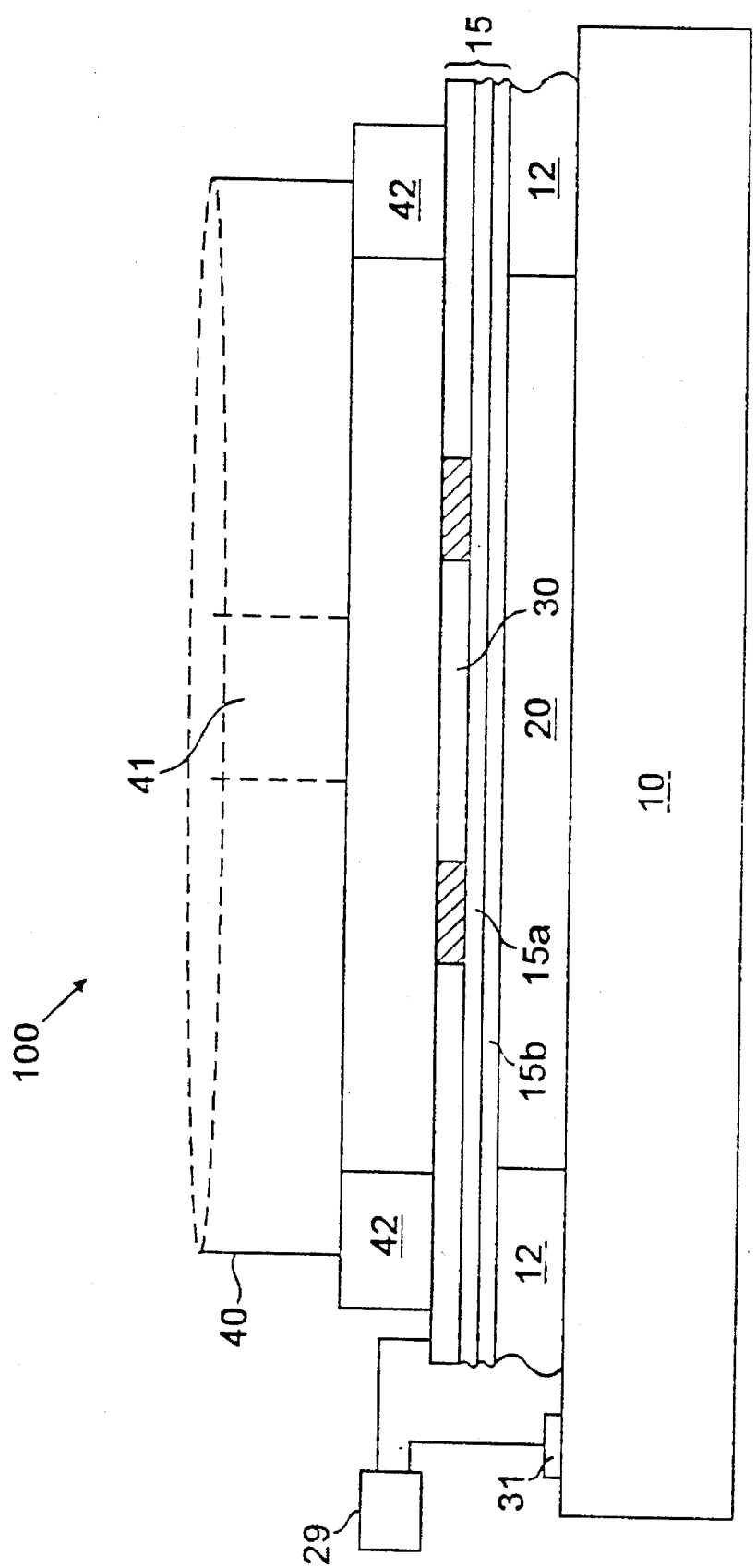
FIG. 15 is a side view of an embodiment of a modulator according to the present invention which incorporates an optical fiber.
Figure 16:
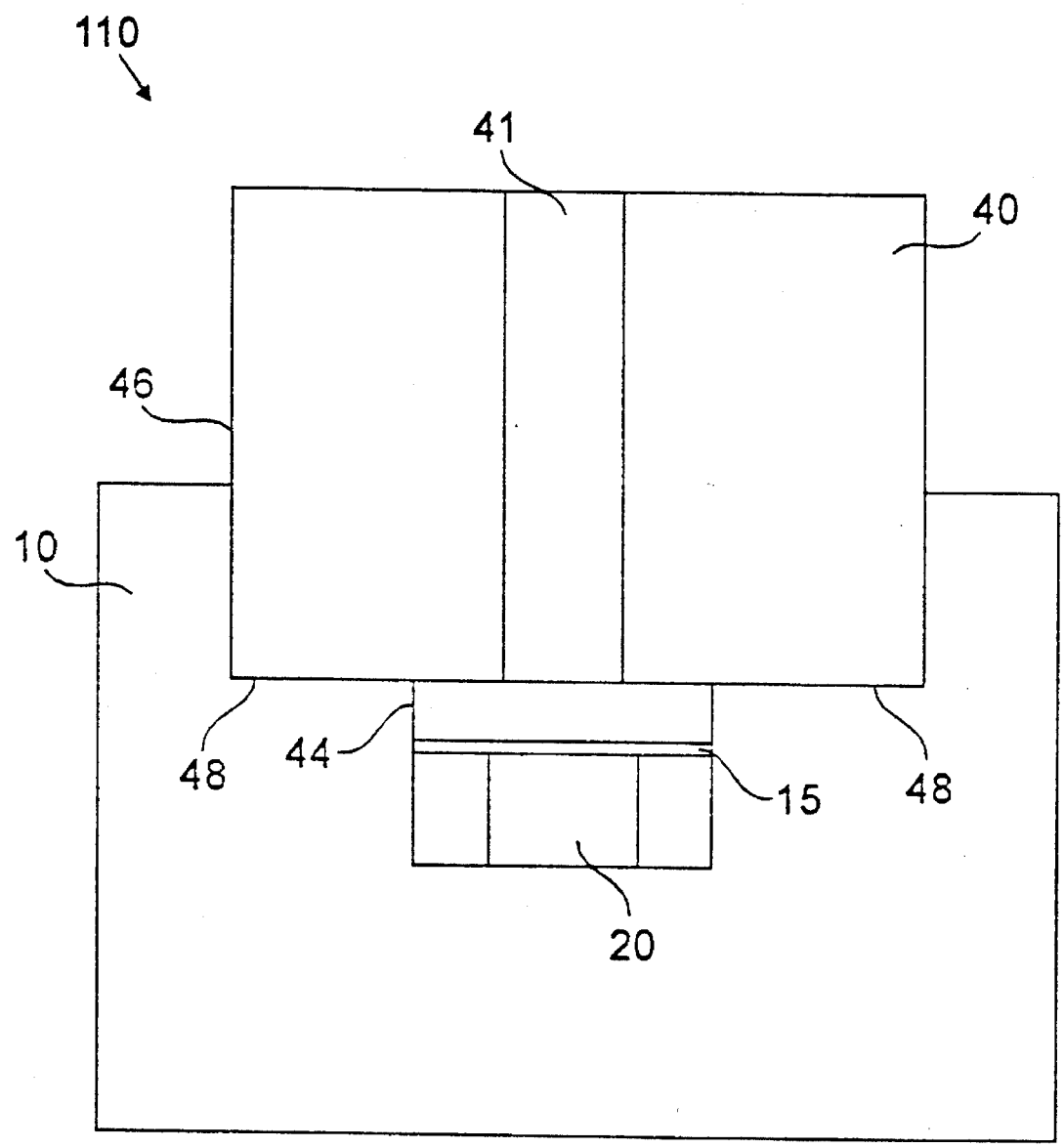
FIG. 16 is a side view of a second embodiment of a modulator according to the present invention which incorporates an optical fiber.

In fourth and fifth embodiments, illustrated in FIGS. 15–16, a micromechanical modulator according to the present invention comprises a membrane 15 and air gap 20, as well as an optical fiber 40 spaced from the membrane 15 to facilitate use in an optical fiber network. In a fourth embodiment, such a modulator 100 could be fabricated by depositing an electrically insulating material such as silicon dioxide in an annular shape around the modulator 100 to form a support 42 for the fiber 40, as shown in FIG. 15. Epoxy or other adhesive material may be used to cement the fiber 40 to the support 42. The fiber 40 is positioned at an odd or even multiple of one-quarter of the basis wavelength above the top of the unbiased membrane 15. If the fiber is positioned at an odd multiple of one-quarter of the basis wavelength above the unbiased membrane, then the air gap 20 between the unbiased membrane 15 and the substrate 10 must be an odd multiple of one-quarter of the basis wavelength. Similarly, if the fiber is at an even multiple of one-quarter of the basis wavelength above the top of the unbiased membrane 15, then the air gap 20 between the unbiased membrane 15 and the substrate 10 must be an even multiple of one-quarter of the basis wavelength. Preferably, the gap between the fiber 40 and the unbiased membrane 15 is $\lambda/4$. The fiber 40 is positioned so that the optical fiber core 41 is normal to, and in optical communication with, the optical window 16 in the membrane 15.

In the fifth embodiment of a micromechanical modulator 110, shown in FIG. 16, two wells, such as wells 44 and 46, are formed in a substrate 10. In well 44, a membrane 15 and an air gap 20 are formed according to any of the methods previously disclosed. Well 46 is sized to receive an optical fiber 40. The annular surface 48 created by the formation of the two wells 44, 46 supports the fiber 40 above the membrane 15. As in the previous embodiment, the fiber 40 is positioned an odd or even multiple of one-quarter of the basis wavelength above the top of the unbiased membrane 15, with the air gap 20 having a complementary position. Again, the gap between the fiber 40 and the unbiased membrane 15 is preferably $\lambda/4$. Further, the fiber core 41 is normal to, and in optical communication with, the optical window 16 in the membrane 15.

Where the micromechanical modulator includes an optical fiber, such as for the modulators 100 and 110, the optically active layer 15a is characterized by a refractive index which is approximately equal to the square root of the product of the refractive indices of the substrate 10 and the fiber 40. The micromechanical modulators 100 and 110 may be formed according to the first arrangement where the air gap 20 and the gap between the fiber 40 and the membrane 15 are one-quarter of the basis wavelength and the membrane 15 contacts the substrate 10 under bias. Alternatively, the micromechanical modulators 100 and 110 may be formed according to the second arrangement wherein the air gap, and gap between the fiber and membrane 15 are a multiple of one-quarter of the basis wavelength and the membrane 15 does not contact the substrate 10 under bias.

As previously noted, in any embodiment of a micromechanical modulator according to the present invention, the membrane 15 may be comprised of one or two layers. Adding a second layer 15b provides an additional degree of freedom in the fabrication of the micromechanical modulator. The second layer 15b is preferably positioned on the side of the membrane 15 closest to the substrate 10. The refractive index of the second layer 15b is preferably approximately equal to that of the substrate. The thickness of layer 15b is preferably one quarter of the basis wavelength as measured within the layer. This results in minimal change in the optical properties of the modulator. However, by adding layer 15b, the mechanical properties of the modulator may be tailored independently of the optical properties. In particular, the overall stress in the membrane 15 may be tailored by adjusting the stress in the second layer 15b. This is particularly advantageous where layer 15a is silicon nitride, the preferred material for this layer, since the stress in a silicon nitride layer cannot be tailored independently of its refractive index.

It is preferred that modulators according to the present invention are formed and operated so that under the action of bias the membrane 15 moves towards the substrate 10. In other words, the size of the air gap 20 decreases under bias. Alternatively, it is within the contemplated scope of this invention that modulators be formed and operated so that membrane 15 moves away from the substrate 10 under the action of bias, i.e., the air gap 20 increases. The optical properties of both versions are the same.

Such a modulator may be formed by suspending an electrode, such as a ring of conductive material, above the membrane 15, i.e., on the side of the membrane furthest from the substrate. By applying a bias voltage across the ring and the membrane 15, an electrostatic attraction will be created, moving the membrane 15 toward the ring, and away from the substrate. The electrode is not limited to a ring of conductive material. However, the configuration should be such that the optical signal will pass through the electrode with minimal signal attenuation.

Alternatively, a bias current rather than a voltage, may be supplied to the modulators discussed previously in this specification, such as modulators 1, 80, 90, 100 and 110. The current can be controlled to produce a magnetic repulsion between the membrane 15 and substrate 10 so that the membrane will move away from the substrate under the action of bias.

Figure 17:
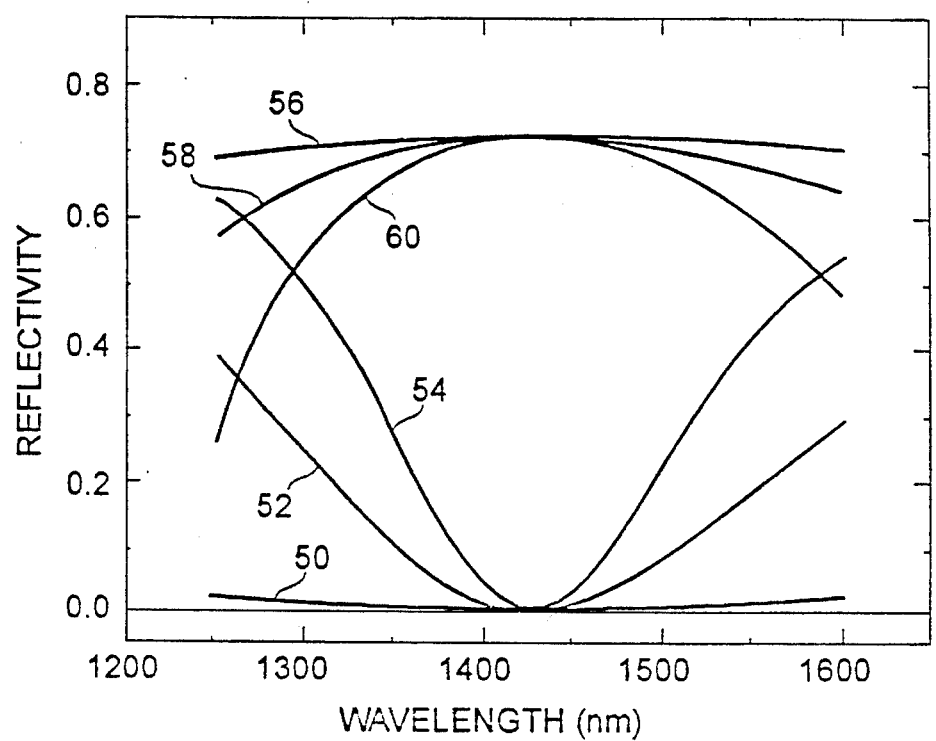
FIG. 17 is a plot of reflectivity vs. wavelength of the modulated signal for a modulator according to the present invention having a single layer membrane.

The performance of several embodiments of the present invention has been modeled, as illustrated in FIGS. 17–22. FIG. 17 shows the expected performance of a modulator according to the present invention, such as modulators 1, 80 or 90, having a single layer membrane 15 of silicon nitride. The signal being modulated is assumed to have a bandwidth extending from 1300 nm to 1550 nm. Thus, the basis wavelength is 1425 nm. The membrane 15 has a layer of silicon nitride which is 1905 angstroms (190.5 nanometers) thick and has a refractive index of 1.87. Thus, the layer thickness is the required one-quarter of the basis wavelength ((190.5×1.87)/1425). FIG. 17 shows the reflectivity of the device as a function of wavelength at a number of values for the air gap. An anti-reflection state is shown at reference numerals 50, 52 and 54, which correspond to air gaps of zero, $\lambda/2$ and $\lambda$, respectively. A maximum reflectivity state is shown at reference numerals 56, 58 and 60, which correspond to air gaps of $\lambda/4$, $3\lambda/4$ and $5\lambda/4$, respectively.

The performance of a modulator, such as modulators 1, 80 or 90, having a single layer membrane 15 and formed according to the first arrangement of the invention, i.e., where the air gap has a value of $\lambda/4$ in the unbiased position and a value of 0 as it contacts the substrate 10 under the action of bias, can thus be evaluated. As shown in FIG. 17, when the air gap is $\lambda/4$, shown at reference numeral 56, reflectivity is at a maximum of about seventy two percent. Only a slight decrease in reflectivity is observed over a bandwidth of 1300 to 1550 nm. When the air gap is equal to zero, shown at reference numeral 50, reflectivity is at a minimum of about two percent or less. This anti-reflection state is maintained even as the wavelength of the modulated signal deviates from the basis wavelength of 1425 nm. While contrast, i.e., the ratio of light reflected in the two states, is at a maximum at the basis wavelength of 1425 nm, there is only a slight decline in contrast over the bandwidth of 1300 nm to 1550 nm.

Performance of a modulator, such as modulators 1, 80 or 90, having a single layer membrane 15 and formed according to the second arrangement of the invention, i.e., where a non-zero air gap is maintained at all times, may also be evaluated from the data displayed in FIG. 17. Such a modulator may have, for example, an unbiased air gap of $3\lambda/4$, shown at reference numeral 58. Under the action of bias, the membrane 15 will move toward the substrate until the air gap has a value of $\lambda/2$, shown at reference numeral 52. Thus, the modulator moves through a high reflection state at reference numeral 58 and an anti-reflection state at reference numeral 52. At the basis wavelength of 1425 nm, the contrast ratio of a modulator according to the second arrangement is as high as the contrast ratio of a modulator according to the first arrangement. However, as the wavelength of the modulated signal deviates from the basis wavelength, contrast declines for a modulator according to the second arrangement. The same performance is observed in moving from an air gap of $5\lambda/4$, shown at reference numeral 60, to an air gap of $\lambda$, shown at reference numeral 54. FIG. 17 shows that as the air gap increases, the contrast ratio decreases as the wavelength of the modulated light deviates from the basis wavelength. This effect is due to the fact that since the light travels a longer path through the modulator, shifts in the wavelength of the light from the basis wavelength are compounded.

Figure 18:
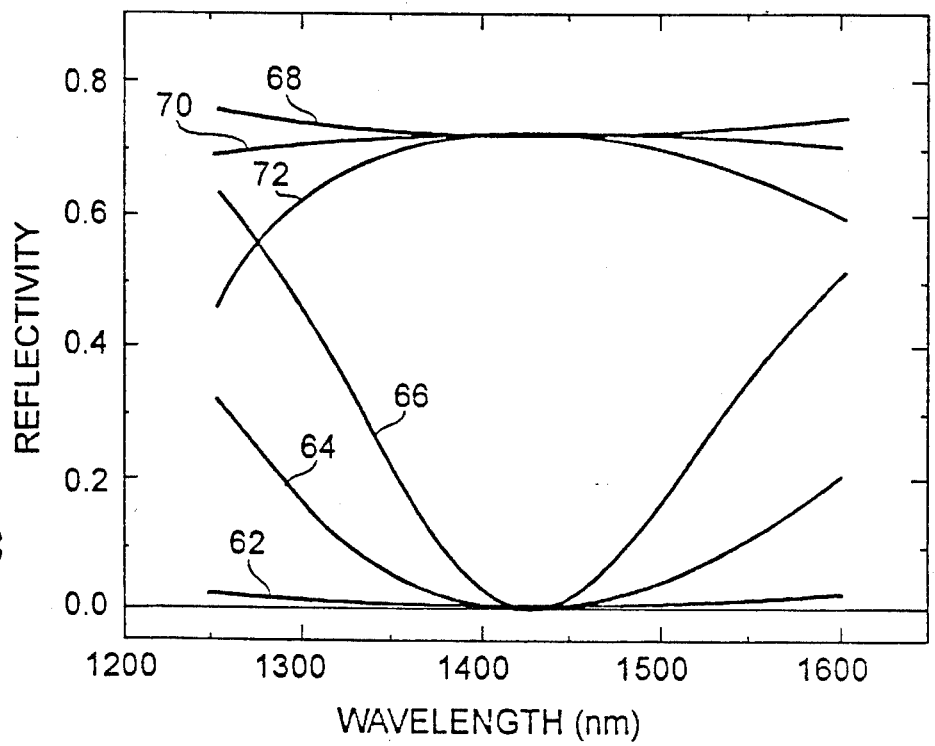
FIG. 18 is a plot of reflectivity vs. wavelength of the modulated signal for a modulator according to the present invention having a dual layer membrane.

FIG. 18 shows the expected performance of a modulator according to the present invention, such as modulators 1, 80 or 90, having a double layer membrane 15. The membrane comprises a silicon nitride layer which is 1905 angstroms thick and has a refractive index of 1.87, and a silicon layer which is 1018 angstroms thick and has a refractive index of 3.5. The optical signal has the same bandwidth and basis wavelength as in FIG. 17. Reflectivity as a function of the wavelength of the modulated signal is shown for the same values of the air gap as in FIG. 17. An anti-reflection state is shown at reference numerals 62, 64 and 66, which correspond to air gaps of zero, $\lambda/2$ and $\lambda$, respectively. A maximum reflectivity state is shown at reference numerals 68, 70 and 72, which correspond to air gaps of $\lambda/4$, $3\lambda/4$ and $5\lambda/4$, respectively. Performance similar to that of the previous example in terms of maximum and minimum reflectivity is predicted.

Figure 19:
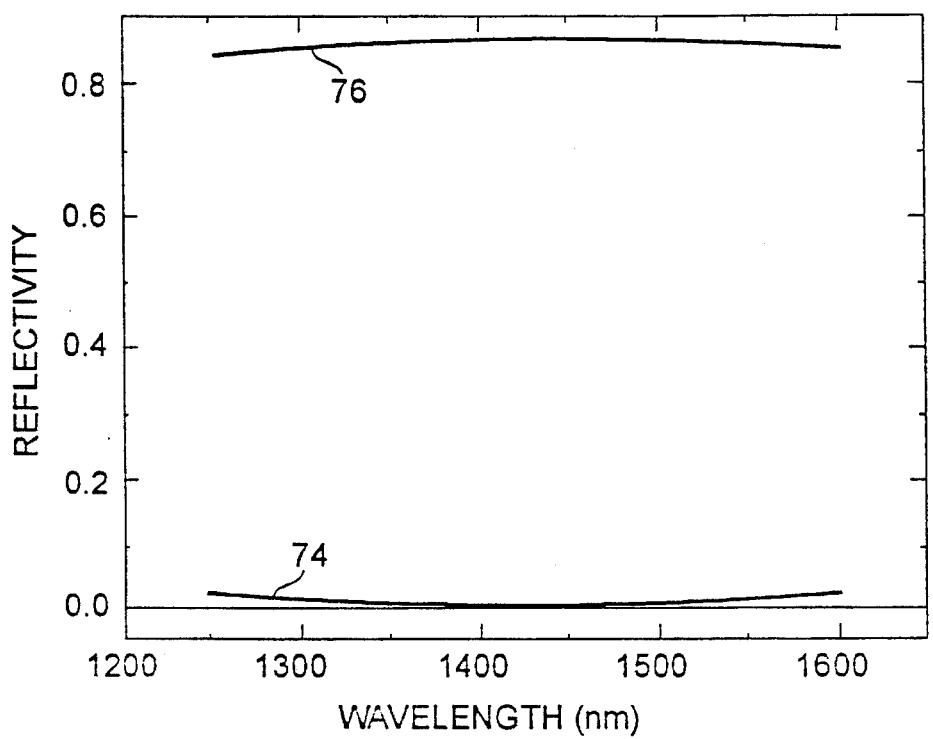
FIG. 19 is a plot of reflectivity vs. wavelength of the modulated signal for air gaps of $\lambda/4$ and 0 for a modulator which incorporates an optical fiber and has a single layer membrane.

In FIGS. 19–22, performance is modeled for a modulator according to the present invention which incorporates a fiber, such as modulators 100 and 110. In all cases, the gap between the fiber and the membrane 15 is $\lambda/4$ in the unbiased position. FIG. 19 shows the expected performance for such a modulator having a single layer membrane 15 and formed according to the first arrangement wherein the air gap is $\lambda/4$ in the unbiased position and the membrane 15 contacts the substrate 10 under the action of bias. Reference numeral 74 denotes reflectivity at a zero air gap and reference numeral 76 denotes reflectivity at a $\lambda/4$ air gap. Comparison of FIGS. 19 and 17 shows that such a modulator is expected to have a higher contrast ratio than a modulator which does not incorporate an optical fiber.

Figure 20:
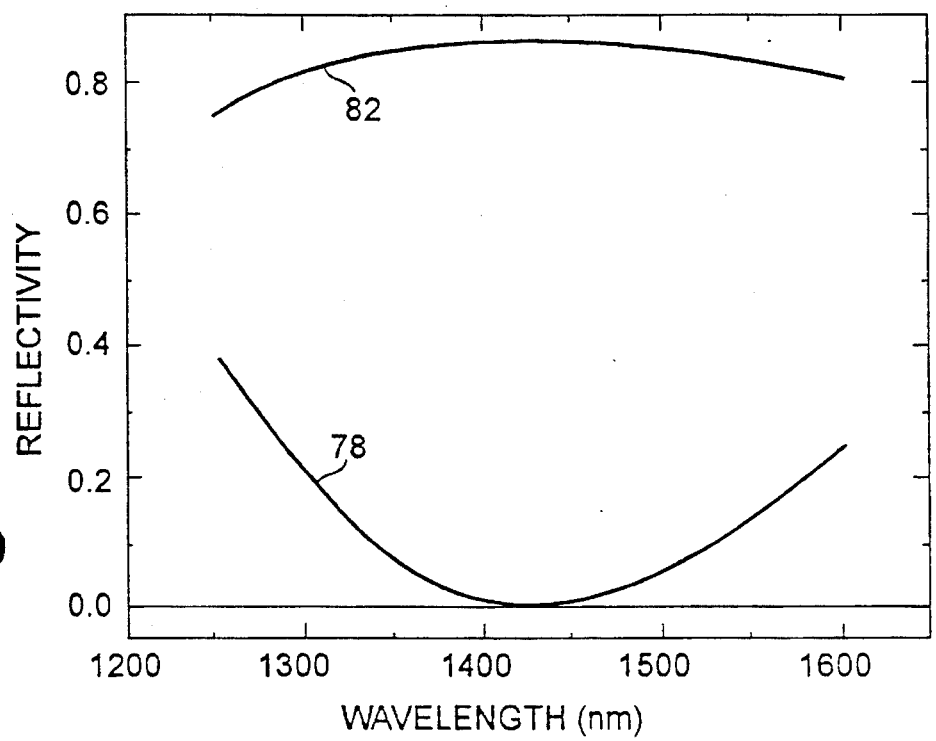
FIG. 20 is a plot of reflectivity vs. wavelength of the modulated signal for air gaps of $3\lambda/4$ and $\lambda/2$ for a modulator which incorporates an optical fiber and has a single layer membrane.

FIG. 20 shows the expected performance for a modulator incorporating a fiber, such as modulators 100 and 110, having a single layer membrane 15, and which is formed according to the second arrangement wherein a non-zero air gap is maintained at all times. In particular, the reflectivity of the modulator is shown for an unbiased air gap of $3\lambda/4$ at reference numeral 82 and for an air gap under bias of $\lambda/2$ at reference numeral 78. FIG. 20 shows that contrast ratio is high at the basis wavelength of 1425 nm, but decreases as the wavelength of the modulated light deviates from the basis wavelength.

Figure 21:
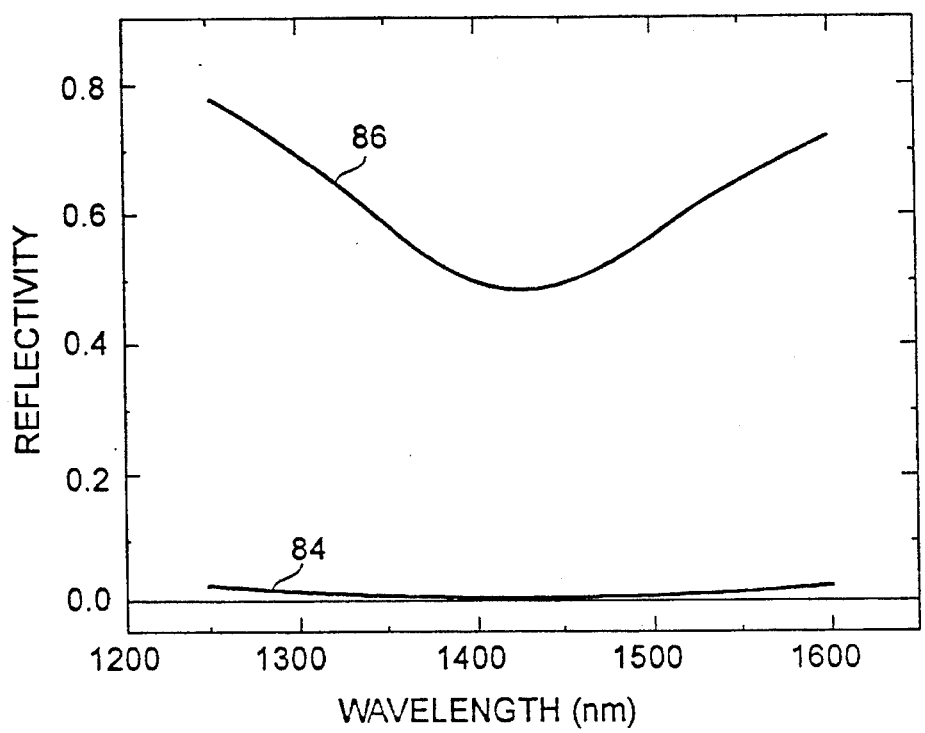
FIG. 21 is a plot of reflectivity vs. wavelength of the modulated signal for air gaps of $\lambda/4$ and 0 for a modulator which incorporates an optical fiber and has a dual layer membrane.
Figure 22:
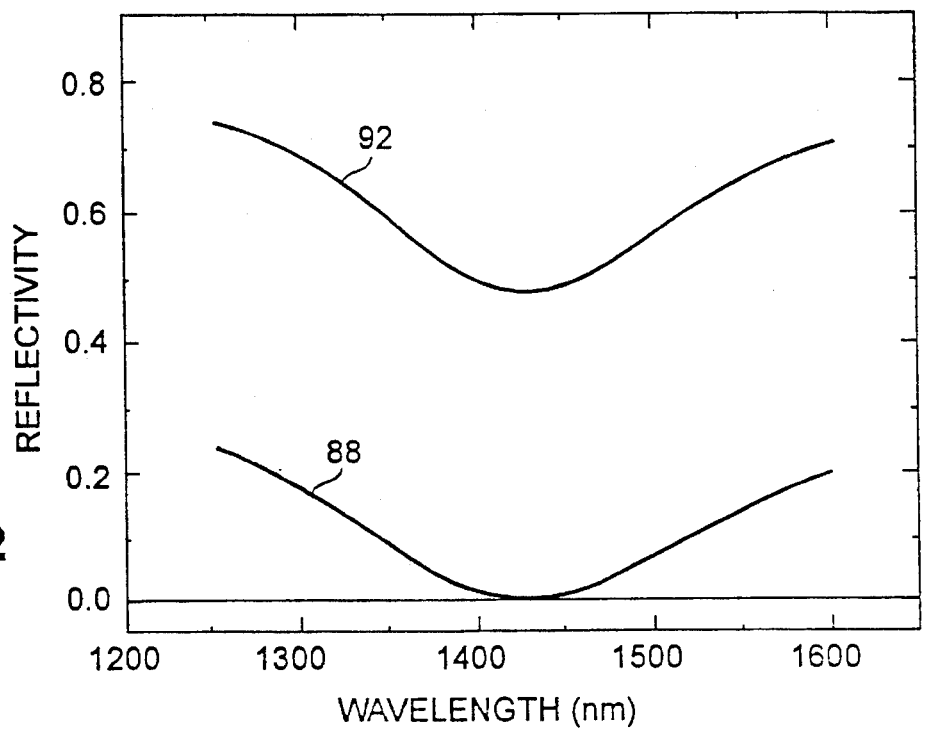
FIG. 22 is a plot of reflectivity vs. wavelength of the modulated signal for air gaps of $3\lambda/4$ and $\lambda/2$ for a modulator which incorporates an optical fiber and has a dual layer membrane.

FIGS. 21 and 22 show the expected performance for a modulator incorporating a fiber and having a two layer membrane 15, such as modulators 100 and 110. In FIG. 21, expected performance is shown for a modulator formed according to the first arrangement. The predicted reflectivity of the modulator at an air gap of $\lambda/4$ is shown at reference numeral 86, and the predicted reflectivity at an air gap of zero is shown at reference numeral 84. FIG. 22 shows the expected performance for a modulator formed according to the second arrangement wherein a non-zero air gap is maintained. The anti-reflection state is shown at reference numeral 88 for an air gap of $\lambda/2$, and the high reflection state is shown at reference numeral 92 for an air gap of $3\lambda/4$.

It should be understood that the embodiments and variations shown and described herein are illustrative of the principles of this invention and that various modifications may occur to, and be implemented by, those skilled in the art without departing from the scope and spirit of the invention.

We claim:

1. A modulator for modulating an optical signal comprising:

a conductive substrate;

a conductive membrane comprising at least a first layer of material, the first layer having a refractive index which is approximately equal to the square root of the refractive index of the substrate, and a thickness approximately equal to one-quarter of a wavelength of the optical signal, as measured within the first layer, the membrane further having an optically transparent portion;

a flexible support for positioning the membrane in a first position wherein the membrane is oriented in spaced and superposed relation to the substrate, defining an air gap which is approximately equal to an integer multiple of one-quarter of a wavelength of the optical signal, as measured in air; and a means for supplying bias;

where, under the action of bias, the membrane moves to a second position, changing the air gap by approximately one-quarter of a wavelength of the optical signal, as measured in air, where the change from the first to the second position causes a change in the amount of the optical signal that is reflected from the membrane.

2. The modulator of claim 1 where, under the action of bias, the flexible support flexes and the membrane moves toward the substrate.

3. The modulator of claim 2 where the substrate is a semiconductor.

4. The modulator of claim 2 where the substrate is silicon.

5. The modulator of claim 2 where the first layer of material is selected from the group consisting of silicon nitride and silicon oxide.

6. The modulator of claim 2 where the membrane comprises a second layer of material having a refractive index approximately equal to the refractive index of the substrate.

7. The modulator of claim 6 where the second layer of material has a thickness approximately equal to one-quarter of a wavelength of the optical signal, as measured within the second layer.

8. The modulator of claim 6 where the second layer of material is the same material as the substrate.

9. The modulator of claim 6 where the second layer of material is polysilicon.

10. The modulator of claim 2 where the integer multiple is one so that the air gap in the first position is approximately equal to one-quarter of a wavelength of the optical signal, as measured in air.

11. The modulator of claim 2 where at least a portion of the membrane is coated with a conductive material which is selected from the group consisting of aluminum, gold, platinum, tungsten and conducting silicon.

12. The modulator of claim 6 where the second layer of material is conductive.

13. The modulator of claim 12 where the flexible support comprises a plurality of flexible support arms.

14. The modulator of claim 13 where at least a portion of the flexible support arms are conductive.

15. A modulator of claim 1 further comprising a support for an optical fiber.

16. A modulator for modulating an optical signal comprising:

a conductive substrate;

an optical fiber having a first end in optical communication with an optically transparent portion of a conductive membrane;

the conductive membrane having a first and a second surface and comprising an optically active layer having a refractive index which is approximately equal to the square root of the product of the refractive indices of the conductive substrate and the optical fiber, and a thickness approximately equal to one-quarter of a wavelength of the optical signal, as measured within the optically active layer; and a means for supplying bias, wherein the first end of the optical fiber is in superposed relation to the first surface of the conductive membrane and is spaced from the first surface by approximately an integer multiple of one-quarter of a wavelength of the optical signal, as measured in air, and where the conductive substrate is oriented in superposed relation to the second surface of the conductive membrane and is spaced from the second surface by approximately an integer multiple of one-quarter of a wavelength of the optical signal, as measured in air, where the space between the second surface of the conductive membrane and the conductive substrate defines a first position of the conductive membrane, and where under the action of bias, the conductive membrane moves to a second position, changing the space between the second surface and the conductive substrate by approximately one-quarter of a wavelength of the optical signal, as measured in air, the change from the first to the second position causing a change in the amount of the optical signal that is reflected from the membrane.

17. A device which, under the action of an applied bias, has a variable reflectivity to an incident optical signal received by the device, comprising:

a substrate;

a membrane comprising at least a first layer of material, the first layer having a refractive index which is approximately equal to the square root of the refractive index of the substrate, the membrane further having an optically transparent portion; and a flexible support for positioning the membrane in a first position wherein the membrane is oriented in spaced and superposed relation to the substrate to form an air gap.

18. The device of claim 17 where the substrate is formed of a conductive material.

19. The device of claim 17 where the substrate is a semiconductor.

20. The device of claim 17 where the substrate is silicon.

21. The device of claim 17 where the first layer of material has a thickness approximately equal to one-quarter of a wavelength of the optical signal, as measured within the first layer.

22. The device of claim 17 where the first layer of material is silicon nitride.

23. The device of claim 17 where the membrane comprises a second layer of material having a refractive index approximately equal to the refractive index of the substrate.

24. The device of claim 23 where the second layer of material has a thickness approximately equal to one-quarter of a wavelength of the optical signal, as measured within the second layer.

25. The device of claim 23 where the second layer of material is the same material as the substrate.

26. The device of claim 23 where the second layer of material is polysilicon.

27. The device of claim 18 where in the first position, the air gap is approximately equal to an integer multiple of one-quarter of a wavelength of the optical signal, as measured in air.

28. The device of claim 27 wherein the integer multiple equals one so that the air gap is approximately equal to one-quarter of a wavelength of the optical signal, as measured in air.

29. The device of claim 27 where at least a portion of the membrane is conductive.

30. The device of claim 29 where the conductive portion of the membrane comprises a layer of conductive material.

31. The device of claim 30 where the conductive material is selected from the group consisting of aluminum, gold, platinum, tungsten and conducting silicon.

32. The device of claim 23 where the second layer of material is conductive.

33. The device of claim 29 further comprising a means for supplying bias.

34. The device of claim 33 where, under the action of bias, the membrane moves to a second position, changing the air gap by approximately one-quarter of a wavelength of the optical signal, as measured in air.

35. The device of claim 34 where, in the second position, the air gap is approximately one-quarter of a wavelength of the optical signal, as measured in air, less than the air gap in the first position.

36. The device of claim 17 where the flexible support is flexible support arms.

37. The device of claim 17 where at least a portion of the flexible support is conductive.

38. The device of claim 36 where there are four flexible support arms.

39. The device of claim 17 further comprising a support for an optical fiber.

40. A device which, under the action of an applied bias, has a variable reflectivity to an incident optical signal received by the device, comprising:
   a substrate; and
   an optical fiber having a first end in optical communication with an optically transparent portion of a membrane;
   the membrane having a first and a second surface and comprising at least a first layer having a refractive index which is approximately equal to the square root of the product of the refractive indices of the substrate and the optical fiber;
   wherein the first end of the optical fiber is in superposed and spaced relation to the first surface of the membrane, and where the substrate is oriented in superposed and spaced relation to the second surface of the membrane so that the membrane is positioned between the first end of the optical fiber and the substrate.

41. The device of claim 40 where the space between the optical fiber and the membrane is approximately equal to one-quarter of a wavelength of the optical signal, as measured in air.

42. A method for modulating an optical signal comprising:
   providing a conductive substrate;
   providing a conductive membrane in spaced and superposed relation to the substrate where the membrane comprises a layer of material having a refractive index which is approximately equal to the square root of the refractive index of the substrate, the membrane further having a first and second position;
   exposing the membrane to an optical signal; and
   applying a bias to move the membrane from the first position to the second position causing the reflectivity of the membrane to change.

43. The method of claim 42 wherein the step of providing a conductive membrane further comprises providing a conductive, flexible support to support the membrane over the substrate.

44. The method of claim 42 wherein the step of providing a membrane further comprises orienting the membrane and substrate so that the space between them is approximately equal to an integer multiple of one-quarter of a wavelength of the optical signal, as measured in air.

45. The method of claim 42 where the step of applying a bias to move the membrane from the first position to the second position further comprises decreasing the size of the space between the membrane and the substrate by one-quarter of a wavelength of the optical signal, as measured in air.

46. A method for modulating an optical signal, comprising the steps of:
   providing a device for modulating an optical signal comprising a membrane and a substrate in spaced, superposed relation, where the membrane comprises a layer of material having a refractive index which is approximately equal to the square root of the refractive index of the substrate, and where the membrane has a first position in the absence of a bias and a second position when bias is applied;
   exposing the device to an optical signal; and
   applying a bias to the device to move the membrane from the first position to the second position.

47. The method of claim 46 where the step of applying a bias to move the membrane from the first position to the second position further comprises decreasing the size of the air gap by one-quarter of a wavelength of the optical signal, as measured in air.

48. A method for making a modulator for modulating an optical signal comprising:
   providing a conductive substrate;
   forming a conductive membrane on the substrate so that an air gap is defined between the membrane and a portion of the substrate, where the membrane comprises at least a first layer of material having a refractive index which is approximately equal to the square root of the refractive index of the substrate.

49. The method of claim 48 where the step of providing a conductive substrate further comprises appropriately doping a semiconductor.

50. The method of claim 48 where the step of forming a membrane further comprises selecting the first layer of material from the group consisting of silicon nitride and silicon oxide.

51. The method of claim 48 where the step of forming a membrane further comprises spacing the membrane from the substrate so that the air gap is approximately equal to an integer multiple of one-quarter of a wavelength of the optical signal, as measured in air.

52. A method for making a modulator for modulating an optical signal comprising:
   providing a conductive substrate;
   forming a conductive membrane on the substrate so that an air gap is defined between the membrane and a portion of the substrate, where the membrane comprises at least a first layer of material having a refractive index which is approximately equal to the square root of the product of the refractive indices of the substrate and the optical fiber;
   forming a support to support an optical fiber so that the optical fiber is spaced from the first layer of the membrane by approximately an integer multiple of one-quarter of a wavelength of the optical signal, as measured in air; and attaching the optical fiber to the support.

53. The method of claim 52 where the step of forming a membrane further comprises spacing the membrane from the substrate so that the air gap is approximately equal to an integer multiple of one-quarter of a wavelength of the optical signal, as measured in air.

54. The method of claim 52 where the step of forming a membrane further comprises forming the first layer of material comprising the membrane so that it has a thickness approximately equal to one-quarter of a wavelength of the optical signal, as measured within the first layer of material.

55. The method of claim 52 where the step of attaching the optical fiber to the support further comprises orienting the optical fiber so that it is in optical communication with the membrane.

* * * * *